D. McDONALD.
PASSENGER CAR.
APPLICATION FILED SEPT. 5, 1912.
1,172,815.
Patented Feb. 22, 1916.
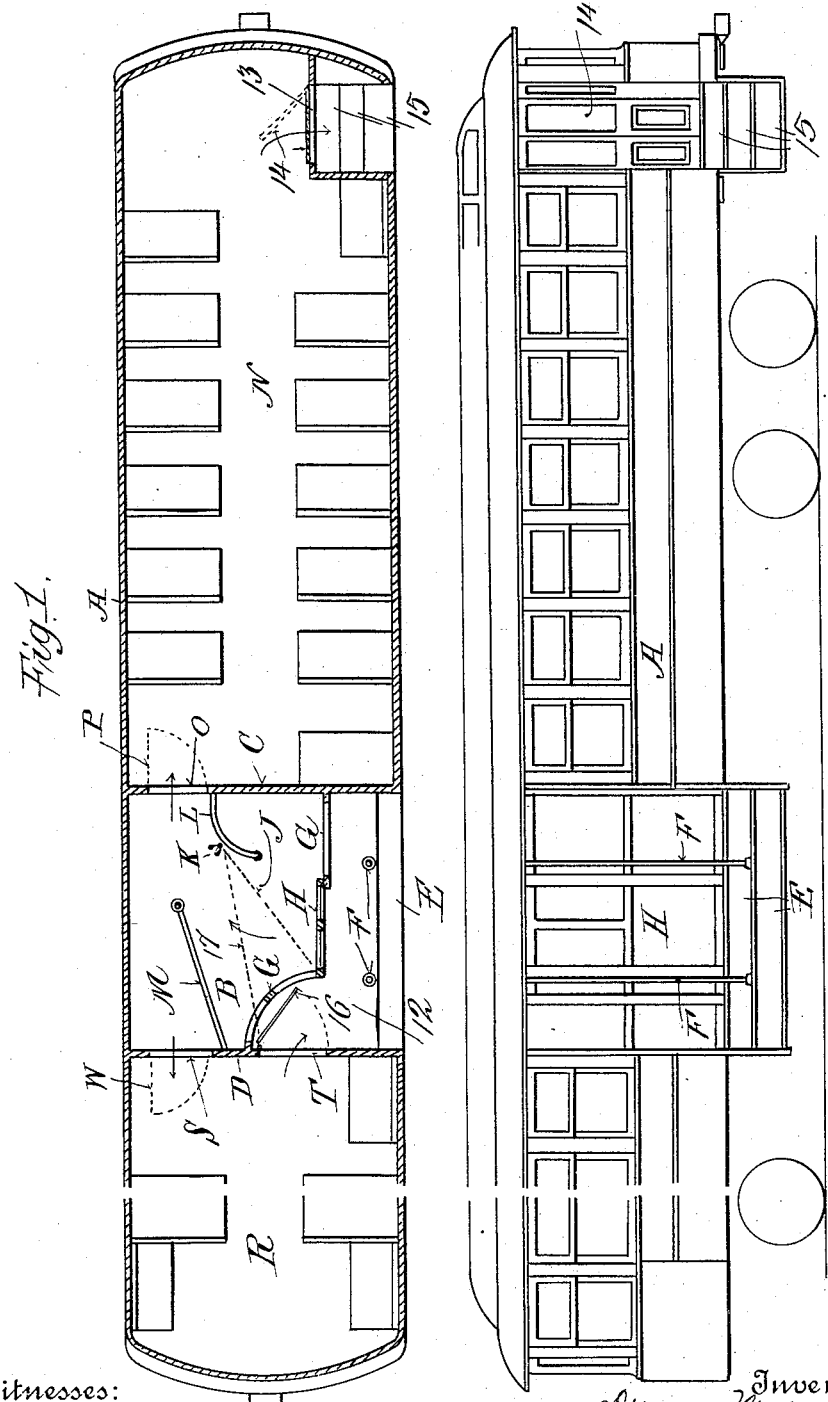

UNITED STATES PATENT OFFICE.

DUNCAN McDONALD, OF MONTREAL, QUEBEC, CANADA, ASSIGNOR TO PAY-AS-YOU-ENTER CAR CORPORATION, OF NEW YORK, N. Y., A CORPORATION OF NEW JERSEY.

PASSENGER-CAR.

1,172,815.  Specification of Letters Patent.  Patented Feb. 22, 1916.

Application filed September 5, 1912. Serial No. 718,613.

*To all whom it may concern:*

Be it known that I, DUNCAN McDONALD, subject of the King of England, residing at Montreal, Province of Quebec, Canada, have made a certain new and useful Invention in Passenger-Cars, of which the following is a specification.

This invention relates to passenger cars, and particularly to passenger cars of the type having an entry way for passengers to enter the car arranged in the side of the car at a point intermediate the ends thereof.

The object of the invention is to provide a passenger car of the type and character referred to, which is simple in construction, and efficient in operation.

A further object is to provide a construction and arrangement of entryway through the side of the car into the body thereof which facilitates the handling of passengers, the collection of fares, and the control of the side entry doorways.

A further object is to provide a passenger car of the type and character referred to wherein boarding and alighting accidents are avoided, and the collection of fares from entering passengers is provided for whether the passengers occupy one end of the car or the other, that is, the provision of means for compelling the entering passengers to pass by the station of the conductor, from which station not only are the fares collected but the entry doorways are controlled, thereby inclosing the conductor inside the car and making him a fare collector rather than a conductor.

Other objects of the invention will appear more fully hereinafter.

The invention consists substantially in the construction, combination, location and arrangement of parts, all as will be more fully hereinafter set forth, as shown in the accompanying drawing and finally pointed out in the appended claims.

Referring to the accompanying drawing and to the various views and reference signs appearing thereon, Figure 1 is a broken view in horizontal sectional plan of a passenger car embodying the principles of my invention. Fig. 2 is a broken view in side elevation of the same.

The same part is designated by the same reference letter wherever it occurs throughout the several views.

In Patent No. 875,740 granted Jan. 7th, 1908, to Ross & McDonald, there is shown, described and claimed, a center entrance door construction of street cars where passengers enter and pay their fares as they enter and then proceed to one end or the other of the car. The present invention relates particularly to a passenger car of this general type.

The special purposes had in view in the present invention is the provision of a doorway and a door for controlling the entrance of passengers to the interior of the car, which door is controlled by the conductor stationed at a convenient point adjacent the entry way into the car and inside the door where he may also attend to the collection of fares and the operating of the center side door.

The present invention also contemplates the employment of means arranged in the entry way for compelling passengers to pass by the station of the conductor on the way into the interior or seating space of the car. After the passengers have entered the car and passed the conductor, they are at liberty to proceed from the fare prepayment point to either end of the car or into the seating space of the car body and then may leave the car as will be more fully described hereinafter.

In the drawings reference letter A designates, generally, the car body. About midway the length of the car, a transverse compartment, indicated generally by reference letter B is provided, and which, if desired, may be separated from the interior or seating space of the car at each end thereof, by means of bulk heads or partitions indicated at CD.

The compartment B may be regarded as a vestibule space which extends transversely across the car body at a point about the midlength of the same. The vestibule space is approached from outside the car by passengers stepping from the street to the floor of the vestibule B, or, if desired, the side of the car may be provided with one or more steps, indicated at E, for the convenience of entering passengers, said steps affording means of access to the floor of the vestibule B. Also, if desired, at the entry way into the vestibule space, suitable vertical rods or stanchions F may be employed as grasp handles for the convenience of passengers boarding or alighting from the vestibule space or floor of the latter. These are particularly desirable whether the elevation of the floor of the vestibule is such as to require side steps or not.

The interior of the vestibule space is separated from the entry way or step E by a partition indicated generally at G. In this partition is a doorway controlled by a door, H, which may be of any suitable or convenient construction or arrangement such as are ordinarily used, or are adapted for use in cars. My invention, however, is not to be limited or restricted to any particular construction of door. The door H is movable and is controlled, as indicated by dotted line at J from a point adjacent and by means of controlling devices indicated at K, located in convenient position to the conductor's station inside the door. As shown the conductor's station is formed by a curved railing L arranged within the vestibule space B, and behind this railing ample space for the conductor is provided, the door controlling device K being located adjacent to or in convenient reach from the conductor's station behind said railing. Also arranged upon the floor of the vestibule space B, is a railing or partition device, indicated at M, which, in the particular form shown, to which, however, my invention is not to be limited or restricted, extends somewhat diagonally across the floor of the vestibule space from the partition D. The provision of this railing, forms a restricted passageway for entering passengers as they pass through the vestibule, thereby compelling the passengers to pass the conductor's station singly, or in single file. This insures the passage of the passengers past the conductor where a fare may be collected from each entering passenger.

The partition C separating the vestibule space B at one side from the seating space of the car or car body N, is provided with a doorway, indicated at O, which, if desired may be controlled by a swinging, folding or other convenient form of door, indicated in dotted line at P, said doorway being located beyond the conductor's station with reference to the entrance to the vestibule, so that passengers after passing the conductor's station may enter the body space or seating space N of the car through said doorway O. Similarly, the partition D, separating the other end or seating space R, of the car body, from the vestibule space B, is provided with two doorways S and T. Passengers may enter the space R at the end of the car from vestibule B, through doorway S, and may leave said end space R for alighting from the car through doorway T. The doorway S is located on the side of the car remote from the entry way into the vestibule B, and communicates between the vestibule B, and the interior seating space or portion R, of the car body, so that passengers entering the vestibule from the street, and after passing the conductor's station through the restricted space between the conductor's station and the guard railing M, may pass around the end of the railing M, and then through the doorway S, to the space R of the car body. If desired, the doorway S, may be controlled by a door of any suitable or convenient construction and arrangement, indicated by dotted lines at W.

The doorway T, leading from the end space R, of the car body, delivers on to a platform indicated at 12, forming part of the floor of the vestibule B, outside of the partition G, so that passengers desiring to leave the car body portion R, after arriving at their point of destination or departure from the car, pass from part R of the car body through the doorway T on to the floor 12, and thence to the street.

The extreme end of the portion N, of the car body is provided with a doorway indicated at 13, through which passengers occupying the portion N, of the car body may pass from the car body to the street, said doorway 13, being controlled by a door, if desired, as indicated at 14, in Fig. 2. If desired exit steps indicated at 15, may be employed at the exit doorway 13. This door will usually be at the front end of the car and under the control of the motorman.

It will be observed that the door 14 and steps 15, are designed and intended to be used only for exit from the car and not for boarding purposes. Similarly, the doorway T, from the interior of the car body portion R to the platform 12, may be employed only as an exit doorway for passengers desiring to leave said portion. It is obvious that the doorway T may be controlled by a door 16, if desired, and this door may be operated or controlled in its operation, from the conductor's station in any suitable or convenient manner, as indicated by the dotted line 17.

It will be understood that the platform 12, is of sufficient area or extent, to permit the entrance of passengers through the doorway controlled by the door H into the interior of the vestibule, while at the same time accommodating the exit of passengers through the doorway T and across the floor 12, to the street.

A construction and arrangement such as above described affords ample facilities for rapidly handling large crowds of passengers desiring to enter or leave cars of the type referred to. It will be observed that when a car stops, for instance at a crowded street corner where a large number of passengers desire to enter the car, the conductor controls the door H, to admit the passengers into the interior of the vestibule. Since the vestibule extends transversely all the way across the body of the car, a large number of passengers desiring to enter may gain the interior of the vestibule before the conductor collects all of the fares from the entering passengers. While the entering passengers are boarding the car, those desiring to leave the car do so through the exit doorway 13, and the exit doorway T. As soon as the boarding passengers gain access to the vestibule space B, the conductor closes the vestibule door H and gives the signal for the car to proceed on its way and during the passage of the car to its next stopping point, the conductor is enabled to complete the collection of the fares of the passengers who may have gained access to the interior of the vestibule space. After the passengers pay their fares they distribute themselves from the vestibule space B to either end of the car, without interference with each other, or without blocking each other during their boarding or alighting movements.

Having now set forth the object and nature of my invention, and a construction embodying the principles thereof, what I claim as new and useful, and of my own invention, and desire to secure by Letters Patent of the United States, is:—

1. A passenger car having an entrance doorway in the side thereof intermediate its ends leading to the car platform, a door for controlling said doorway, means arranged on said platform inside the doorway for affording a conductor's station, means extending diagonally across the rear portion of said platform for confining the entrance way of entering passengers to a single path closely adjacent the conductor's station, and entry doorways beyond the single path by the conductor's station into the body of the car and respectively leading to the end portions of the car.

2. A passenger car having a transversely extending vestibule, intermediate the ends thereof and end portions, said end portions forming seating spaces, said vestibule being separated from the end portions by partitions, a door for controlling the entry of passengers into the vestibule, doorways communicating between the vestibule and the seating spaces at the respective ends of the car body, a curved railing arranged within the vestibule adjacent one of the partitions thereof, to afford a conductor's station, a railing extending from the opposite partition of the vestibule, to restrict the passage of the entering passengers past the conductor's station, and means located at the conductor's station for controlling the vestibule entry door.

3. In a passenger car, a vestibule extending transversely across the car body, intermediate the ends of the latter to divide the car into end portions, each end portion having a seating space for the passengers, a side door controlling the entry of passengers in the vestibule, a railing arranged within the vestibule, to define a conductor's station, means located at the conductor's station for controlling the movements of the vestibule side door, a railing extending across the vestibule floor to restrict the passage way of entering passengers past the conductor's station, and an exit doorway, from each end portion of the car.

4. A passenger car, having a transversely extending vestibule, and partitions separating the vestibule from the respective ends of the car, an entry doorway through one of said partitions, and an entry way and an exit way through the other of said partitions, a framing separating the entry and exit doorways in said last mentioned partition, said framing having a door therein, a railing arranged inside the last mentioned door and forming a conductor's station, means arranged adjacent the conductor's station for controlling the operation of said door, a transversely extending railing for restricting the passage-way of entering passengers past the conductor's station, and an exit doorway at the far end of one of the end portions of the car body.

5. A passenger car having transversely extending partitions intermediate its ends and side wall portions connecting said partitions to form a completely inclosed vestibule space, entrance doorways through said partitions respectively leading from the inclosed vestibule space into the end portions of the car, a side entrance door for said inclosed vestibule space, an exit doorway in one of said partitions, said exit doorway located outside of the inclosed vestibule space, and an exit doorway at the far end of the other car end portion.

6. A passenger car having transversely extending partitions intermediate its ends to form seating spaces at each end of the car, said partitions extending the transverse width of the car, side wall portions associated with said partitions to form a completely inclosed vestibule, doorways leading from said inclosed vestibule into each seating space.

7. A passenger car having transversely extending partitions intermediate its ends to form seating spaces at each end of the car, said partitions extending the transverse width of the car, side wall portions associated with said partitions to form a completely inclosed vestibule, doorways leading from said inclosed vestibule into each seating space, and exit doorways from each end seating space.

8. A passenger car having transversely extending partitions to form separated end seating portions with a vestibule between them, doorways leading from the vestibule into the end seating portions, inclosing side walls for the vestibule, an entrance door located in one of said side walls, a means located within the vestibule to form a fare prepayment station, a railing extending diagonally across the vestibule to restrict the passageway past the fare prepayment station, and means located adjacent the fare prepayment station for controlling the operation of the vestibule side wall door.

In testimony whereof I have hereunto set my hand in the presence of the subscribing witnesses, on this 22nd day of August A. D., 1912.

DUNCAN McDONALD.

Witnesses:
A. MICHAUD,
Jos. C. CASAVANT.

Copies of this patent may be obtained for five cents each, by addressing the "Commissioner of Patents, Washington, D. C."